(12) United States Patent
Yuan et al.

(10) Patent No.: US 11,300,149 B2
(45) Date of Patent: Apr. 12, 2022

(54) FLOATING NUT, BATTERY ASSEMBLY AND VEHICLE

(71) Applicant: NIO (ANHUI) HOLDING CO., LTD., Hefei (CN)

(72) Inventors: Chunping Yuan, Shanghai (CN); Jan Bengtsson, Shanghai (CN); Nan Li, Shanghai (CN); Xiaotao Tian, Shanghai (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 391 days.

(21) Appl. No.: 16/454,608

(22) Filed: Jun. 27, 2019

(65) Prior Publication Data
US 2020/0003248 A1 Jan. 2, 2020

(30) Foreign Application Priority Data
Jun. 27, 2018 (CN) .......................... 201820998652.2

(51) Int. Cl.
*F16B 37/04* (2006.01)
*F16B 37/06* (2006.01)
(Continued)

(52) U.S. Cl.
CPC .......... *F16B 37/044* (2013.01); *F16B 37/062* (2013.01); *F16L 37/08* (2013.01); *H01M 50/20* (2021.01); *F16B 37/04* (2013.01)

(58) Field of Classification Search
CPC ...... F16B 37/044; F16B 37/062; F16B 37/04; F16B 37/08; F16L 37/08; H01M 50/20
(Continued)

(56) References Cited

U.S. PATENT DOCUMENTS 4,768,907 A * 9/1988 Gauron ................. F16B 37/044
411/112
5,033,924 A * 7/1991 Cosenza ............... F16B 39/284
411/282

(Continued)

FOREIGN PATENT DOCUMENTS

CA 2690717 A1 * 12/2008 .............. F16B 39/24
JP 2001278110 A * 10/2001
(Continued)

OTHER PUBLICATIONS

Rhombus, Math is Fun, Jan. 2, 2018, <https://web.archive.org/web/20180113185040/https://www.mathsisfun.com/geometry/rhombus.html> (Year: 2018).*

*Primary Examiner* — Roberta S Delisle
(74) *Attorney, Agent, or Firm* — Sheridan Ross P.C.

(57) ABSTRACT

The present invention provides a floating nut, a battery assembly and a vehicle. The floating nut comprises a limit box defining a cavity located therein and a nut body which comprises an axially extending body and a flange radially extending from one end of the body, wherein the size of the flange is configured to adapt to fit within the cavity; and an outer contour of the flange is configured in the shape of a parallelogram, and the parallelogram is configured to have diagonal lines of unequal lengths. The floating nut, the battery assembly and the vehicle of the present invention have the advantages such as being simple in structure, easy to manufacture and convenient for installation, can be used in a limited space, and can reduce the risk of failure.

20 Claims, 1 Drawing Sheet

(51) Int. Cl.
*F16L 37/08* (2006.01)
*H01M 50/20* (2021.01)

(58) Field of Classification Search
USPC ........................................................ 411/112
See application file for complete search history.

(56) References Cited

U.S. PATENT DOCUMENTS

| | | | | | |
|---|---|---|---|---|---|
| 5,096,350 | A | * | 3/1992 | Peterson | F16B 37/044 411/108 |
| 6,146,071 | A | * | 11/2000 | Norkus | F16B 37/044 296/187.09 |
| 6,758,645 | B2 | * | 7/2004 | Curley, Jr. | F16B 37/044 411/107 |
| 2004/0005205 | A1 | * | 1/2004 | Yake | F16B 37/044 411/112 |
| 2004/0042868 | A1 | * | 3/2004 | Yake | F16B 33/06 411/111 |
| 2004/0047705 | A1 | * | 3/2004 | Cutshall | F16B 37/044 411/111 |
| 2004/0081530 | A1 | * | 4/2004 | Lee | F16B 37/044 411/111 |
| 2004/0228700 | A1 | * | 11/2004 | Clinch | F16B 37/044 411/112 |
| 2005/0220562 | A1 | * | 10/2005 | Blackaby | F16B 37/044 411/111 |
| 2014/0136805 | A1 | * | 5/2014 | Shah | G06F 3/0619 711/162 |
| 2014/0169908 | A1 | * | 6/2014 | Wong | F16B 37/045 411/85 |
| 2019/0331158 | A1 | * | 10/2019 | Bacon, Jr. | F16B 37/044 |

FOREIGN PATENT DOCUMENTS

| | | | | |
|---|---|---|---|---|
| JP | 2002087333 | A | * | 3/2002 |
| JP | 2013113391 | A | * | 6/2013 |

* cited by examiner

FLOATING NUT, BATTERY ASSEMBLY AND VEHICLE

CROSS-REFERENCE TO RELATED APPLICATIONS

This application claims the benefit of China Patent Application No. 201820998652.2 filed Jun. 27, 2018, the disclosure of which is incorporated herein by reference in its entirety.

TECHNICAL FIELD

The present invention relates to a fastening device. More specifically, the present invention relates to a floating nut that has good operating performance. The present invention also relates to a battery assembly comprising the above floating nut, and a vehicle comprising the floating nut and/or the battery assembly mentioned above.

BACKGROUND ART

Floating nuts are widely used in the industry of machinery, such as automobiles. For example, floating nuts can be used to secure automotive components to an automobile body. An existing floating nut can be used to secure a replaceable battery pack to the bottom of an automobile.

However, the existing floating nut often has a rectangular nut body and a matched rectangular limit box. However, the rectangular limit box generally needs to occupy a large area and is thus difficult to be used in a space-constrained environment. Moreover, the existing floating nuts are prone to failure due to staggering of threads.

Therefore, there is a continuing demand for new floating nuts, battery assemblies and vehicles, which expects that the floating nuts can be used in a limited space and can reduce the risk of failure.

SUMMARY OF THE INVENTION

One object of the present invention is to provide a floating nut that can be used in a limited space and can reduce the risk of failure. Another object of the present invention is to provide a battery assembly comprising the above floating nut, and a vehicle comprising the floating nut or the battery assembly mentioned above.

The object of the present invention is achieved by the following technical solution:

a floating nut, comprising:
a limit box defining a cavity located therein; and
a nut body, which comprises an axially extending body and a flange radially extending from one end of the body;
wherein the size of the flange is configured to adapt to fit within the cavity; and an outer contour of the flange is configured in the shape of a parallelogram, and the parallelogram is configured to have diagonal lines of unequal lengths.

Optionally, the limit box comprises: a base, which has a flat shape on a first plane and comprises a first hole; and two or more curved portions, which extend out from the base and form a second hole corresponding to the first hole, wherein the two or more curved portions enclose the cavity together with the base; and an inner wall of the body is provided with threads, and the size of the body is configured to adapt to pass through the second hole.

Optionally, the outer contour of the flange is configured in the shape of a rhombus.

Optionally, the center of the body is substantially located at the center of the outer contour of the flange.

Optionally, the base is configured in a rectangular shape, and the two curved portions extend from edges of the base and each comprise: a first portion extending in a direction perpendicular to the first plane, and second portions extending toward each other on a second plane parallel to the first plane;

wherein ends of the curved portions respectively have a notch, and the notches enclose together to form the second hole located in the second plane.

Optionally, the body is configured in a substantially cylindrical shape, the second hole is configured in the shape of a rectangle, a square or a rounded rectangle, and the limit box is configured in the shape of a rectangle, a square or a rounded rectangle.

Optionally, the base is further provided with a nut.

Optionally, a plurality of support portions are provided at the periphery of the first hole to support the nut body.

Disclosed is a battery assembly, which comprises the above floating nut.

Disclosed is a vehicle, which comprises the above floating nut and/or comprises the above battery assembly.

The floating nut, the battery assembly and the vehicle of the present invention have the advantages such as being simple in structure, easy to manufacture and convenient for installation. The floating nut of the present invention can be used in a limited space and can reduce the risk of failure.

BRIEF DESCRIPTION OF THE DRAWINGS

The present invention will be further described below in detail in conjunction with the accompanying drawings and the preferred embodiments. However, those skilled in the art would have appreciated that these drawings are drawn merely for the purpose of illustrating the preferred embodiments, and thus should not be taken as limitation on the scope of the present invention. In addition, unless otherwise specified, the drawings are merely intended to be conceptually illustrative of the constitution or construction of the described objects and may include exaggerated representations, and the drawings are not necessarily drawn to scale.

DETAILED DESCRIPTION OF EMBODIMENTS

Figure 1:
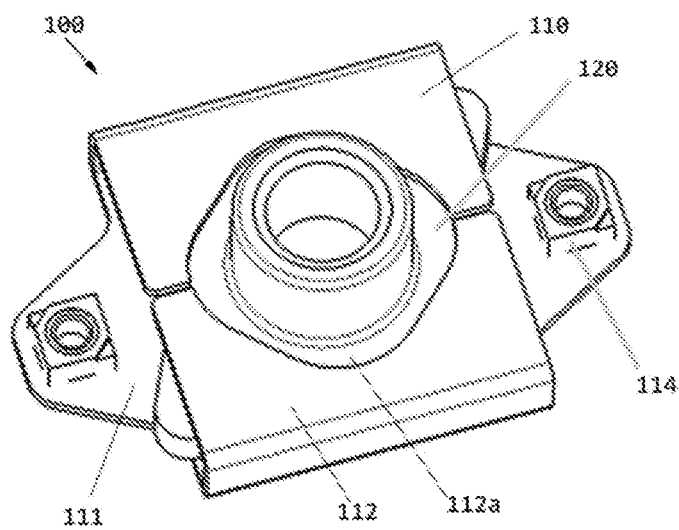
FIG. 1 is a perspective view of one embodiment of a floating nut assembly of the present invention.

The preferred embodiments of the present invention will be described below in detail with reference to the accompanying drawings. Those skilled in the art would have appreciated that such description is merely illustrative and exemplary, and should not be construed as limitation on the scope of the present invention.

First, it should be noted that the orientation terms, such as top, bottom, upward and downward, referred to herein are defined with respect to the directions in the drawings, and they are relative concepts and can thus vary depending on their different locations and different practical states. Therefore, these or other orientation terms should not be construed as limiting terms.

In addition, it should be indicated that any single technical feature described or implied in the embodiments herein, or any single technical feature as shown or implied in the drawings could still be further combined among these technical features (or equivalents thereof) so as to obtain other embodiments of the present invention that are not directly mentioned herein.

It should be noted that in different drawings, the same reference numerals denote the same or substantially the same components.

Figure 2:
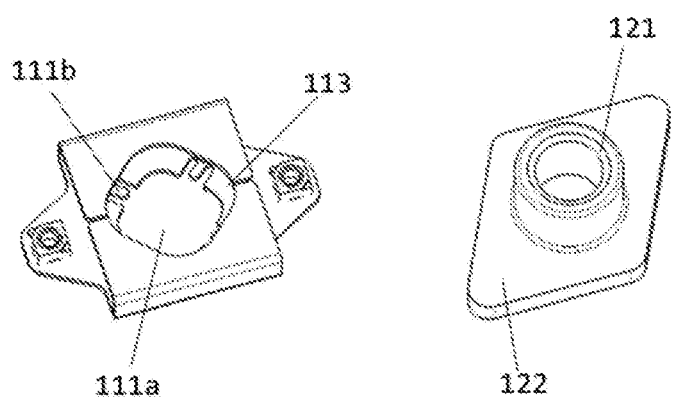
FIG. 2 is an exploded view of the embodiment as shown in FIG. 1.

FIG. 1 is a perspective view of a floating nut 100 according to an exemplary embodiment of the present invention, and FIG. 2 is an exploded view of the embodiment as shown in FIG. 1. A floating nut 100 comprises a limit box 110 defining a cavity 113 located therein; and a nut body 120, which comprises an axially extending body 121 and a flange 122 radially extending from one end of the body 121. The size of the flange 122 is configured to adapt to fit within the cavity 113 and an outer contour of the flange 122 is configured in the shape of a parallelogram. The parallelogram of the edge of the flange 122 is configured to have diagonal lines of unequal lengths. Therefore, the shape of the flange 122 is configured such that its two parallel sides are in contact with and positioned with respect to an inner wall of the limit box 110.

Specifically, the limit box 110 comprises a base 111 and two or more curved portions 112. The base 111 has a flat shape on a first plane and comprises a first hole 111a. The two or more curved portions 112 extend out from the base 111 and form a second hole 112a opposite the first hole 111a, in which the two or more curved portions 112 enclose the cavity 113 together with the base 111.

The nut body 120 comprises a body 121, which has an axial extending first end and are provided with threads on an inner wall, and a flange 122, which radially extends, around the body 121, from a second end of the body 121.

The size of the body 121 is configured to adapt to pass through the second hole 112a, and the size of the flange 122 is configured to adapt to be received within the cavity 113.

Optionally, an outer contour of the flange 122 is configured in the shape of a rhombus or in other parallelogram shapes.

Optionally, the center of the body 121 is substantially located at the center of the outer contour of the flange 122.

Optionally, as shown, the base 111 is configured in the shape of a rectangle, and the two curved portions 112 extend from edges of the base 111. The two curved portions 112 each comprise a first portion extending in a direction perpendicular to the first plane and a second portion extending on a second plane parallel to the first plane, where the second portions of the two curved portions 112 extend toward each other on the second plane. Ends of the curved portions 112 each have a notch, and the notches enclose together to form the second hole 112a located in the second plane. In one embodiment of the present invention, the first hole 111a and the second hole 112a are configured to be substantially parallel to each other.

Thus, when being assembled in position, the two opposing edges of the flange 122 face the first portions of the curved portions 112, and one end of the body 121 extends through the second hole 112a, and the other end thereof faces the first hole 111a.

As shown, edges of the flange 122 opposite the first portions of the curved portions 112 may be upper and lower edges or left and right edges as shown in FIG. 2. Those skilled in the art would have readily appreciated that, as the assembly condition changes, the upper and lower edges or the left and right edges of the flange 122 may face toward the first portions of the curved portions 112 or away from the first portions of the curved portions 112.

Optionally, the body 121 is configured in a substantially cylindrical shape, and the second hole 112a is configured in the shape of a rectangle, a square or a rounded rectangle.

Optionally, the limit box 110 is configured in a rectangular shape. However, depending on actual needs, the limit box 110 may also be configured in other shapes, including but not limited to a rounded rectangle, a square, etc.

Optionally, as shown, the base 111 is further provided with nuts 114. The nuts 114 may be disposed on the base 111 by means of welding, riveting or other methods.

Optionally, a plurality of support portions 111b are provided at the periphery of the first hole 111a to support the nut body 120.

The present invention further relates to a battery assembly that is secured to a vehicle via the floating nut 100 as described above. In one embodiment, a single battery assembly is secured to the bottom of the vehicle frame via a plurality of floating nuts 100. Those skilled in the art would further have applied the floating nut 100 according to the present invention to securing other vehicle components or accessories according to actual needs.

The present invention further relates to a vehicle comprising one or more floating nuts 100 as described above and/or comprising the battery assembly as described above.

The floating nut 100 of the present invention can be used in a limited space while still provide a sufficient floating space and a load surface. In addition, the floating nut 100 of the present invention allows for greater tightening torque and loosening torque, effectively extending the range of use of the floating nut 100. In extreme cases (e.g., staggering of threads), the floating nut 100 according to the present invention can be manually loosened by a user so as to disassemble the associated components.

In one embodiment of the present invention, the floating nut 100 allows for a tightening torque of approximately 250 N*M to 300 N*M. The floating nut 100 of the present invention allows for the use of a greater tightening torque or loosening torque as compared to the tightening torque of approximately 50 N*M of the prior art.

In addition, by using a square limit box, the floating nut 100 of the present invention can be used in a limited space, thereby achieving the technical effect of a rectangular limit box. The floating nut 100 of the present invention has a floating amount and a fitting area both substantially equal to those of the floating nut using a rectangular limit box, so as not to cause the performance degradation.

This description discloses the present invention with reference to the accompanying drawings, and also enables those skilled in the art to implement the present invention, including manufacturing and using any device or system, selecting a suitable material, and using any combined method. The scope of the present invention is defined by the claimed technical solutions and includes other examples that would have occurred to those skilled in the art. As long as such other examples include structural elements that are not different from the claimed technical solutions in literal language, or such other examples contain equivalent structural elements that are not substantially different from the claimed technical solutions in literal language, such other examples should be considered within the scope of protection as determined by the technical solutions claimed by the present invention.

What is claimed is:
1. A floating nut, comprising:
a limit box defining a cavity located therein, the limit box comprising:

a base extending along a first plane and defining a rectangular area, the rectangular area comprising a first edge extending from a first side of the rectangular area to a second side of the rectangular area and a second edge offset a distance from the first edge, the second edge extending from the first side of the rectangular area to the second side of the rectangular area;

a first bend portion formed along the first edge and extending from the base to a second plane that is offset a distance from the first plane;

a second bend portion formed from the first bend portion and extending along the second plane in a direction from the first edge to the second edge, wherein the second bend portion covers a portion of the base;

a third bend portion formed along the second edge and extending from the base to the second plane; and a fourth bend portion formed from the third bend portion and extending along the second plane in a direction from the second edge to the first edge, wherein the fourth bend portion covers a portion of the base; and a nut body, comprising an axially extending body and a flange radially extending from one end of the body;

wherein the flange is configured to adapt to fit at least partially within the cavity, wherein an outer contour of the flange is configured in a parallelogram shape comprising diagonal lines of unequal lengths, wherein the outer contour of the flange comprises a first set of opposing parallel sides, and a second set of opposing parallel sides, and wherein a first parallel side of the first set of opposing parallel sides is disposed in contact with the first bend portion, and wherein a second parallel side of the first set of opposing parallel sides is disposed in contact with the third bend portion.

2. The floating nut according to claim 1, wherein the base is flat and comprises a first hole passing therethrough, wherein the second bend portion comprises a first notch disposed therein, wherein the fourth bend portion comprises a second notch disposed therein, wherein the first notch and the second notch together form a second hole arranged in the second plane that is axially aligned with the first hole in the base, wherein the body comprises an inner wall comprising threads, and wherein a size of the body is configured to adapt to pass through the second hole.

3. The floating nut according to claim 1, wherein the outer contour of the flange is configured in a rhombus shape.

4. The floating nut according to claim 1, wherein a center of the body is substantially located at a center of the outer contour of the flange.

5. The floating nut according to claim 1, wherein the base is configured in a square shape wherein the first bend portion extends in a direction perpendicular to the first plane, wherein the third bend portion extends in the direction perpendicular to the first plane, and wherein the second plane is disposed parallel to the first plane.

6. The floating nut according to claim 5, wherein the body is configured in a substantially cylindrical shape, the second hole is configured in a first shape of a rectangle, a square, or a rounded rectangle, and the limit box is configured in a second shape of a rectangle, a square, or a rounded rectangle.

7. The floating nut according to claim 1, further comprises:

a first nut attached to the base adjacent the first side of the rectangular area; and a second nut attached to the base adjacent the second side of the rectangular area.

8. The floating nut according to claim 1, wherein a plurality of support portions are disposed in the base around a periphery of the first hole to support the nut body.

9. The floating nut according to claim 1, wherein a first parallel side of the second set of opposing parallel sides is disposed facing away from the first bend portion.

10. The floating nut according to claim 1, wherein the rectangular area is square and a length of the distance from the first edge is equal to a length of the first edge and a length of the second edge.

11. The floating nut according to claim 1, wherein the first bend portion corresponds to a load surface, and wherein the floating nut is capable of receiving a tightening torque of 250 Nm to 300 Nm without failing.

12. A captive nut assembly, comprising:

a cage, comprising:

a flat base extending along a first plane and defining a rectangular area of the cage, wherein a first hole is disposed passing through a center of the flat base;

a first bend portion formed along a first edge of the rectangular area and extending a dimension from the first plane to a second plane, wherein the second plane is offset from the first plane;

a second bend portion formed along an entirety of an edge of the first bend portion and extending along the second plane and over a first portion of the rectangular area;

a third bend portion formed along a second edge of the rectangular area that is offset from the first edge of the rectangular area by a distance, wherein the third bend portion extends the dimension from the from the first plane to the second plane; and a fourth bend portion formed along an entirety of an edge of the third bend portion and extending along the second plane over a second portion of the rectangular area, wherein an end of the fourth bend portion is disposed adjacent to an end of the second bend portion;

a cutout disposed in the second bend portion and the fourth bend portion, the cutout forming a second hole that is axially aligned with the first hole; and a nut body, comprising:

a flange shaped as a flat parallelogram and comprising an outer perimeter comprising a first set of opposing parallel sides, and a second set of opposing parallel sides, and wherein a first parallel side of the first set of opposing parallel sides is disposed in contact with the first bend portion; and a body disposed entirely within the outer perimeter of the flange and protruding in an axial direction away from the flange;

wherein the flange is at least partially disposed in the rectangular area of the cage, and wherein the body is disposed in the second hole capturing the nut body in the cage.

13. The captive nut assembly of claim 12, wherein a second parallel side of the first set of opposing parallel sides is disposed in contact with the third bend portion.

14. The captive nut assembly of claim 13, wherein the first plane and the second plane are arranged parallel to one another.

15. The captive nut assembly of claim 14, wherein the first bend portion is arranged perpendicular to the first plane and the second plane.

16. The captive nut assembly of claim 15, wherein the third bend portion is arranged perpendicular to the first plane and the second plane.

17. The captive nut assembly of claim 16, wherein the nut body comprises a threaded hole passing through the flange and the body.

18. The captive nut assembly of claim 17, wherein the cage further comprises:
   a first nut attached to the flat base adjacent a first side of the rectangular area; and
   a second nut attached to the flat base adjacent a second side of the rectangular area, wherein the second side of the rectangular area is disposed opposite the first side of the rectangular area.

19. The captive nut assembly of claim 18, wherein a first parallel side of the second set of opposing parallel sides is disposed facing away from the first bend portion.

20. A floating nut assembly, comprising:
   a limit box defining a cavity located therein, the limit box comprising:
      a base extending along a first plane and defining a rectangular area, the rectangular area comprising a first edge extending from a first side of the rectangular area to a second side of the rectangular area and a second edge offset a distance from the first edge, the second edge extending from the first side of the rectangular area to the second side of the rectangular area;
      a first wrap-around portion formed having a first bend arranged at the first edge and a first portion extending a distance from the first bend to a first point, and a second bend adjacent the first point and a second portion extending along a second plane that is offset from and parallel to the first plane, the second portion covering a first area of the base;
      a second wrap-around portion formed having a third bend arranged at the second edge and a third portion extending a distance from the third bend to a third point, and a fourth bend adjacent the third point and a fourth portion extending along the second plane, the fourth portion covering a second area of the base; and
   a nut body, comprising:
      an axially extending body; and
      a flange radially extending from one end of the body;
   wherein the flange is disposed at least partially within the cavity between the base and the first wrap-around portion and the second wrap-around portion, wherein an outer contour of the flange is configured in a parallelogram shape comprising diagonal lines of unequal lengths, wherein the outer contour of the flange comprises a first set of opposing parallel sides, and a second set of opposing parallel sides, and wherein a first parallel side of the first set of opposing parallel sides is disposed in contact with the first portion, wherein a second parallel side of the first set of opposing parallel sides is disposed in contact with the third portion, wherein a first parallel side of the second set of opposing parallel sides is disposed facing away from the first portion at an acute angle, and wherein a second parallel side of the second set of opposing parallel sides is disposed facing away from the third portion at the acute angle.

* * * * *